United States Patent
Mandell et al.

(10) Patent No.: US 6,259,899 B1
(45) Date of Patent: Jul. 10, 2001

(54) SYSTEM AND METHOD FOR ANALYSIS OF INTERMODULATION DISPERSION

(75) Inventors: Michael I. Mandell; Arnold L. Berman, both of Los Angeles, CA (US)

(73) Assignee: Hughes Electrical Corporation, El Segundo, CA (US)

( * ) Notice: Subject to any disclaimer, the term of this patent is extended or adjusted under 35 U.S.C. 154(b) by 0 days.

(21) Appl. No.: 09/185,780

(22) Filed: Nov. 4, 1998

(51) Int. Cl.[7] .................................................. H04Q 7/20
(52) U.S. Cl. ........................ 455/115; 455/102; 455/103; 455/114; 455/12.1; 330/124 R; 330/154; 330/149
(58) Field of Search .................................. 455/102, 103, 455/114, 115, 16–22; 375/296; 330/124 R, 154, 149

(56) References Cited

U.S. PATENT DOCUMENTS

| | | | |
|---|---|---|---|
| 4,907,004 | * 3/1990 | Zacharatos et al. | 342/373 |
| 5,638,024 | * 6/1997 | Dent et al. | 330/84 |
| 5,966,048 | * 10/1999 | Thompson | 330/124 R |
| 5,969,572 | * 10/1999 | Jeong et al. | 330/149 |
| 6,006,111 | * 12/1999 | Rowland | 455/561 |
| 6,061,568 | * 5/2000 | Dent | 455/450 |

* cited by examiner

Primary Examiner—Daniel Hunter
Assistant Examiner—Alan T. Gantt
(74) Attorney, Agent, or Firm—T. Gudmestad

(57) ABSTRACT

A system and method for determining dispersion of intermodulation power in a satellite communication system or any other system which can be mathematically modeled as a matrix multiplication followed by an instantaneous non-linearity and another matrix multiplication include determining a matrix (V) representing amplitudes and frequencies of signals generated by a digital processor and input to a plurality of amplifiers. A matrix (M) representing signal propagation from the amplifiers to a destination is used to determine the intermodulation power at the destination within each transmitted beam at each intermodulation distortion frequency. The intermodulation distortion frequencies are determined based on sums and differences of component frequencies corresponding to the user signals. By considering only third-order intermodulation effects and performing a frequency domain analysis, the present invention is computationally efficient enough to analyze cellular communications systems containing a large number of individual users, a large number of amplifiers, and a complex multi-beam antenna. The improvement of signal to intermodulation power ratio when going from the amplifiers on a satellite to the received signals on the ground.

21 Claims, 6 Drawing Sheets

SYSTEM AND METHOD FOR ANALYSIS OF INTERMODULATION DISPERSION

TECHNICAL FIELD

The present invention relates to a system and method for determining the dispersion of intermodulation power.

BACKGROUND ART

Intermodulation is the production of spurious signals having frequencies corresponding to the sum and difference frequencies of the fundamentals and their harmonics produced by a nonlinear element, such as a diode or amplifier. For applications including, but not limited to, multi-user cellular satellite communications systems, the nonlinearity is typically created by High Power Amplifiers (HPAs) driven into saturation. However, these amplifiers operate more efficiently when they are driven near saturation. Thus, the system designer strives to optimize the performance of the HPAs by selecting an optimal operating point for all the HPAs based on the particular application.

For practical systems, the intermodulation (IM) power generated by the HPAs is dominated by third-order effects having sum and difference terms which are difficult to filter and therefore lead to nonlinear distortion. This distortion diverts a portion of the input power to various harmonics. As such, it is desirable to minimize the effect of IM power on the received signals. The signal to IM power ratio may be used to measure this effect. This ratio may be improved by either increasing the signal power or decreasing the IM power. However, an increase in signal power may actually result in more significant IM distortion depending upon the operating point of the corresponding amplifier(s). Reduction of IM power for a particular signal or beam may be accomplished by spatial dispersion of the IM power across multiple beams or cells. As such, it is useful to quantify the spatial dispersion of IM power which is the improvement in signal to IM power ratio from the HPAs on a satellite to the received signals on the ground.

Standard simulation techniques quantify IM power by generating time domain samples of the input waveform to each HPA, then using an HPA transfer characteristic to compute time domain samples of the output waveform from the HPA. This widely accepted simulation technique has a running time proportional to the product of the total number of time samples considered and the total number of HPAs in the simulation. For multi-user cellular systems, this technique requires long running times because the number of HPAs in such a system is typically large, and because such multi-user signals are typically wide-band, which requires a large number of samples in the simulation. For practical systems with several hundred users and over 100 HPAs, the standard simulation technique is prohibitively slow and thus not feasible.

SUMMARY OF THE INVENTION

Thus, it is an object of the present invention to provide a system and method for computing the dispersion of intermodulation (IM) power in a system that can be mathematically modeled as a matrix multiplication followed by an instantaneous nonlinearity and then followed by another matrix multiplication.

Another object of the present invention is to provide a system and method for analyzing intermodulation dispersion which is computationally efficient.

A further object of the present invention is to provide a system and method for computing dispersion of intermodulation power for analyzing a cellular system consisting of a large number of individual users, a large number of HPAs, and a complex multi-beam antenna.

A still further object of the present invention is to provide a system and method for quantifying the spatial dispersion of intermodulation power.

Another object of the present invention is to provide a system and method for evaluating intermodulation dispersion in selecting an optimal operating point for the HPAs in a satellite communication system.

In carrying out the above objects, and other objects, features, and advantages of the present invention, a system and method for analyzing dispersion of intermodulation power include performing a frequency domain analysis which tracks the frequency and amplitude for each user signal, considers only third-order intermodulation effects, and computes an improvement in signal to IM ratio between the HPAs and received signals without computing a signal to IM ratio at either the HPAs (source) or the received signal location (destination). In one embodiment of the present invention, the system and method include determining an input signal representation, determining signal power transmitted in each beam at each frequency and, determining signal power for each source of nonlinearity at each frequency. The system and method also include determining the signal power in each beam and each frequency, determining a representation for nonlinearities produced by each source of nonlinearity at a first frequency, calculating the far-field contribution at the first frequency due to call all sources of nonlinearity, and repeating the calculations for each frequency.

The present invention provides a number of advantages over prior art approaches. By using a frequency domain analysis and considering only third-order effects, the present invention has a computational efficiency far greater than standard simulation techniques. This approach does not require generating time domain samples of any signals in the system. As such, the present invention does not require specification of the operating point of the HPAs. Rather, the present invention computes the improvement in signal to IM ratio between the HPAs on the satellite and received signals on the ground without actually computing the signal to IM ratio at either location.

The present invention is computationally efficient enough to treat cases of a cellular system consisting of a large number of individual users, a large number of HPAs, and a complex multi-beam antenna. Having quantified the IM dispersion, the satellite system designer can use this information to select an optimal operating point for the HPAs in the system by evaluating performance for various configurations. This provides the opportunity for significant improvements of the efficiency and cost of the system.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

The present invention may be used for any system that can be mathematically modeled using matrix multiplications and instantaneous nonlinearities. The multi-user cellular satellite communication embodiment described below is one such system which is modeled by a matrix multiplication followed by an instantaneous nonlinearity and another matrix multiplication. Of course, the present invention may be applied to a wide variety of other systems, such as systems employing a defocused antenna array with a reflector, hybrid matrices to distribute power among amplifiers, and digital beam forming. Likewise, the present invention may be applied to a system employing a direct radiating antenna array, no hybrid matrices, and digital beam forming. In addition, the present invention may be applied to a system having a defocused antenna array with a reflector, hybrid matrices to distribute power among amplifiers, and analog beam forming, among numerous others. The present invention quantifies the increase in signal to intermodulation (IM) power ratio going from the signals present at the instantaneous nonlinearity to the output of the final matrix multiplication.

Figure 1:
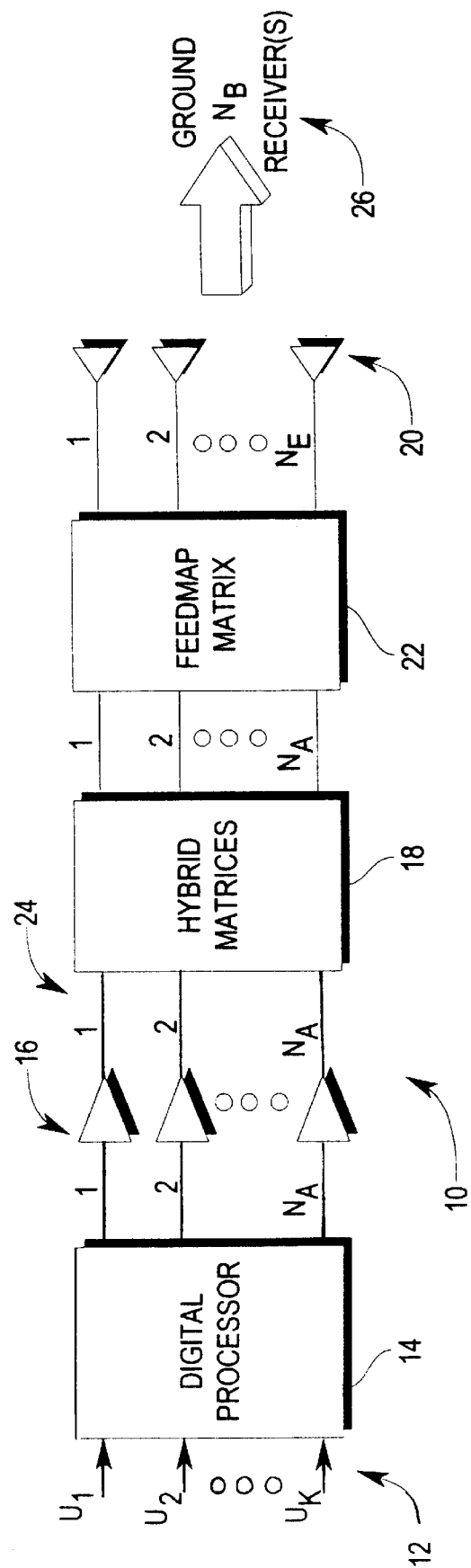
FIG. 1 is a simplified block diagram illustrating relevant components of a satellite communication system for analysis by a system or method according to the present invention.

A simplified block diagram of the relevant components of a satellite transmitter is shown for illustrative purposes in FIG. 1. Satellite transmitter 10 processes a number of user signals 12 with each user signal characterized by a data modulated signal, a spatial beam destination on the ground, and a corresponding carrier frequency. This architecture includes a digital processor 14 which produces signals at the input of High Power Amplifiers (HPAs) 16. The signals then pass through a network of hybrid matrices 18, and finally to individual antenna feed elements 20 via a feedmap matrix 22. Feedmap matrix 22 simply provides a connection between each port of hybrid matrix 18 and one of antenna feed elements 20.

The signals at the output of each HPA, indicated generally by reference numeral 24, contain power from each user signal 12 in addition to intermodulation products caused by amplifier nonlinearities. Thus, an effective signal to IM power ratio seen at the output 24 of the HPAs can be defined. This effective IM power ratio is formed by computing the relative levels of all the third-order products, which dominate the nonlinear multi-carrier behavior over the entire operating range. In the far field, the IM power is spatially distributed among the various cells or beams. Since the signal power is focused into a single cell, this results in an increase in the signal to IM ratio when going from the HPA outputs 24 to the received signals on the ground, indicated generally by reference numeral 26.

The satellite system architecture illustrated in FIG. 1, which uses hybrid matrices 18 in combination with feedmap matrix 22, is designed to spread the power as evenly as possible among the HPAs 16. This is particularly desirable in situations where a relatively small number of antenna feeds are used to form a single beam. Hybrid matrices 18 help distribute the power among the HPAs 16. Feedmap matrix 22 is used to ensure that the feeds that form a single beam are distributed among the hybrids so that the power is effectively distributed among all amplifiers.

Figure 2:
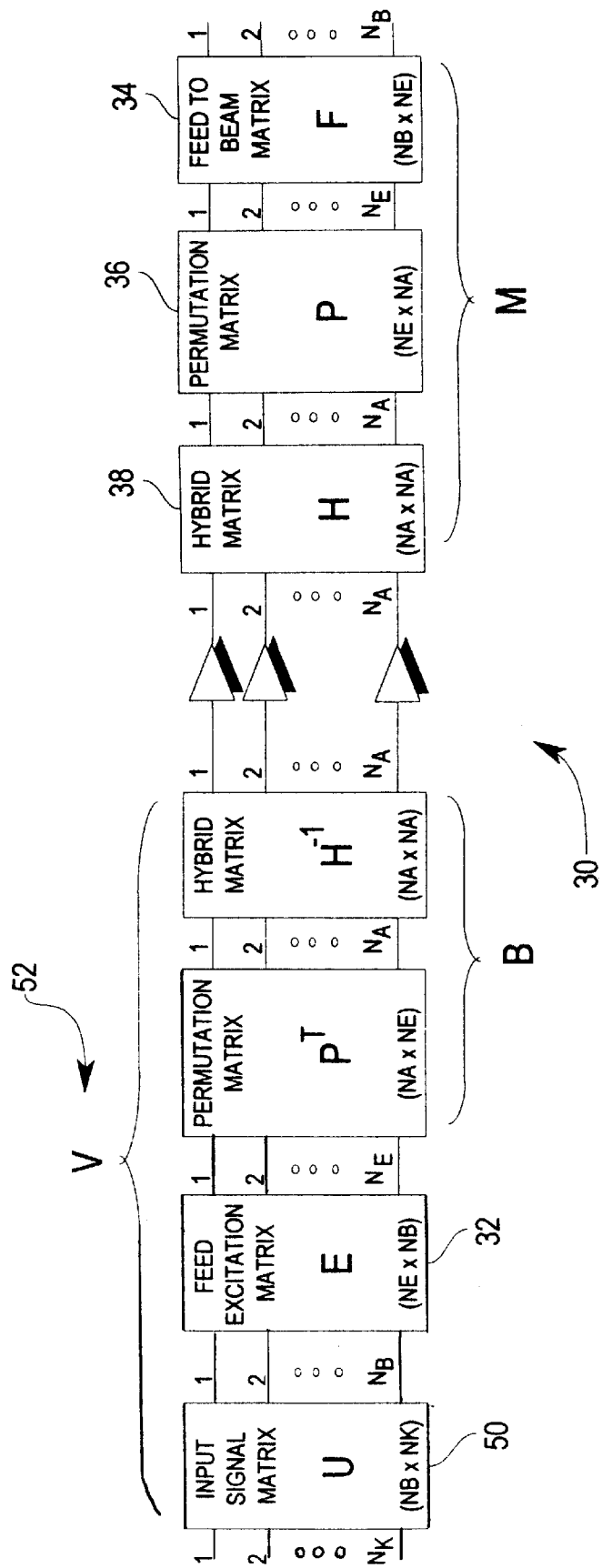
FIG. 2 is a block diagram of a simulation model for a satellite system having components as illustrated in FIG. 1 according to the present invention.

Referring now to FIG. 2, a block diagram illustrating a mathematical model which may be used for simulation of a satellite system for analysis according to the present invention is shown. As illustrated in FIG. 2, $N_B$ represents the number of beams or cells on the ground, $N_E$ represents the number of antenna feed elements on the spacecraft, $N_A$ represents the number of HPAs on the spacecraft, $N_F$ represents the number of frequency channels in the system, and $N_K$ represents the number of users in the system. To produce each of the $N_B$ beams on the ground, there is a corresponding set of amplitude and phase excitations for the $N_E$ antenna feeds.

If the beams are indexed by
$b, (b \in \{1, 2, \ldots, N_B\})$,
and the antenna feeds are indexed by
$e, (e \in \{1, 2, \ldots, N_E\})$,
then a feed excitation matrix E, represented by reference numeral 32 of model 30, includes elements $E_{e,b}$ which represent the complex excitation of feed e to form beam b. Matrix E 32 is a complex matrix of dimensions $(N_E \times N_B)$. This level of modeling encompasses virtually any conceivable antenna configuration. For example, in a direct radiating array, each beam may excite all feeds with the same amplitude and some phase distribution. This would correspond to an excitation matrix 32 E where the complex numbers in each column have the same magnitude and the corresponding phase distribution. At the other extreme is the case where the spacecraft has a separate antenna corresponding to each beam on Earth, rather than an antenna array, which results in the excitation matrix E being a diagonal matrix.

The feed-to-beam matrix F, represented by reference numeral 34, is closely related to the excitation matrix E. Each element $F_{b,c}$ of matrix F represents the complex signal received on the ground in the center of beam b when feed e has an excitation of unity. Matrix F is a complex matrix of dimension $(N_B \times N_E)$. If the antenna beams were ideal in the sense that they had no side lobes, then the matrices E and F would be orthogonal, i.e. the matrix product FE would be diagonal. However, since the side lobes of each antenna patterns are in general nonzero, these matrices are not orthogonal. As such, this allows modeling of the effects of beam side lobes on system performance.

The feedmap matrix represents the connections between the hybrid matrix and feed elements with each hybrid matrix port being connected to a feed element. The feedmap matrix, or permutation matrix, represented by reference numeral 36, is defined as $$P_{e,a} = \begin{cases} 1 & \text{if hybrid matrix output } a \text{ connects to antenna feed } e, \\ 0 & \text{otherwise.} \end{cases}$$

where
$a \in \{1, 2, \ldots, N_A\}$
and
$e \in \{1, 2, \ldots, N_E\}$.
Matrix P is a permutation matrix of dimension $(N_A \times N_E)$ where $N_A \geq N_E$. For the case of strict inequality where $N_A > N_E$, it is assumed that unconnected hybrid matrix ports are terminated in a matched load.

Figure 3:
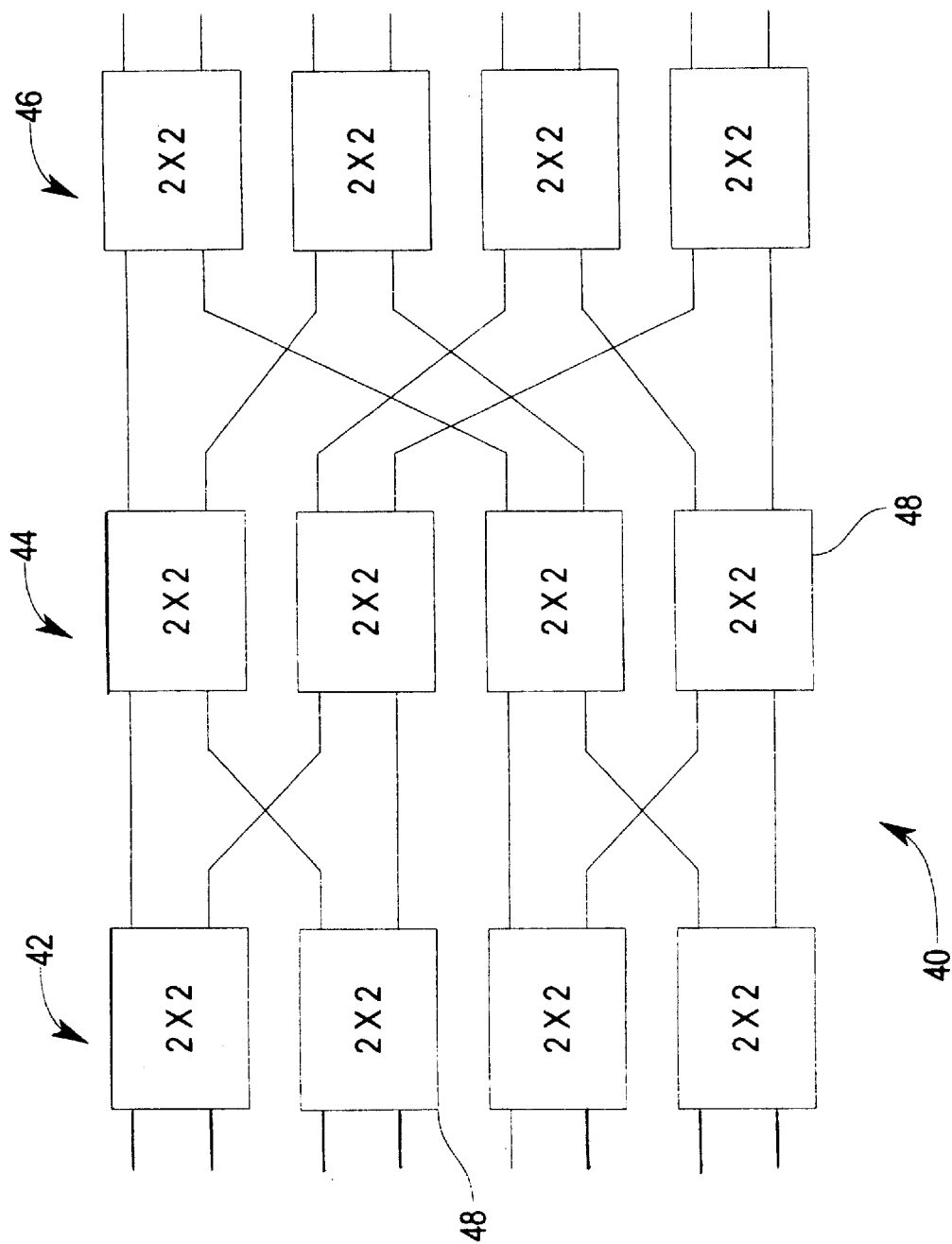
FIG. 3 is a block diagram illustrating construction of an 8×8 hybrid from 2×2 hybrids for use in modeling of a satellite communication system according to the present invention.

For this analysis, the system architecture may contain an arbitrary number of 2×2 hybrids connected in an arbitrary configuration at the outputs of the HPAs. A hybrid matrix H, represented by reference numeral 38, is defined as the net resulting matrix multiplication due to these (2×2) hybrids. FIG. 3 illustrates one example of how an (8×8) hybrid may be constructed from (2×2) hybrids. In this example, hybrid 40 is constructed from three layers 42, 44, 46 of (2×2) hybrids 48. This corresponds to the following matrix $H_8$:

$$H_8 = \frac{1}{\sqrt{8}} \begin{bmatrix} +1 & -j & -j & -1 & -j & -1 & -1 & +j \\ -j & -1 & -1 & +j & +1 & -j & -j & -1 \\ -j & -1 & +1 & -j & -1 & +j & -j & -1 \\ -1 & +j & -j & -1 & -j & -1 & +1 & -j \\ -j & +1 & -1 & -j & -1 & -j & +j & -1 \\ -1 & -j & +j & -1 & -j & +1 & -1 & -j \\ -1 & -j & -j & +1 & +j & -1 & -1 & -j \\ +j & -1 & -1 & -j & -1 & -j & -j & +1 \end{bmatrix}$$

If there are 32 HPAs and 4 (8×8) hybrids constructed as illustrated in FIG. 3, with HPAs one through eight connected to the first hybrid, HPAs 9 through 16 connected to the second hybrid, etc., then the resulting (32×32) hybrid matrix H is represented by:

$$H = \begin{bmatrix} H_8 & 0 & 0 & 0 \\ 0 & H_8 & 0 & 0 \\ 0 & 0 & H_8 & 0 \\ 0 & 0 & 0 & H_8 \end{bmatrix}.$$

This architecture results in the even spreading of power among the HPAs. In situations where a relatively small number of antenna feeds are used to form a single beam, the hybrid matrices serve to help distribute the power among the HPAs. If the feedmap matrix is used to ensure that the feeds that form a single beam are distributed among the four hybrids, the power is effectively distributed among all the amplifiers. In this manner, the combination of the hybrid matrices and feedmap matrix is an attempt to distribute power as evenly as possible among the HPAs.

Each of the $N_K$ users in the system is indexed by an integer k
where
$(k \in \{1, 2, \ldots, N_K\})$.
User k is described as having a frequency f(k), amplitude $A_k$, destination beam b(k), and a phase modulated data stream $\theta_k(t)$ independent of all other users. As such, a user's signal is represented by:

$$u_k(t) = A_k \cos(2\pi f(k) \, t + \theta_k(t)) = \mathrm{Re}\{A_k e^{j(2\pi f(k)t + \theta_k(t))}\}.$$

For the intermodulation calculation according to the present invention, the contributions of each user are tracked separately. The input signal matrix U, having dimension ($N_B \times N_K$) and represented by reference numeral 50 in FIG. 2, is defined by:

$$U_{b,k} = \begin{cases} u_k(t) & \text{if } b(k) = b, \text{ (user } k \text{ has destination beam } b \\ 0 & \text{otherwise.} \end{cases}$$

With reference to FIGS. 1 and 2, digital processor 14 must produce the signals for each of the HPAs 16 such that after passing through hybrid matrix 18 and feedmap matrix 22, antenna feed elements 20 see the proper excitations for each beam as given by the columns of the excitation matrix E (32). This is accomplished for each user by having the digital processor 14 produce the matrix V having dimension ($N_A \times N_K$) and represented by reference numeral 52, where:
$V = H^{-1} P^T E U.$ As such, column k of matrix V represents the set of HPA input signals due to user k.

By virtue of the feedmap matrix and hybrid matrix, this system architecture tends to spread the power among all of the HPAs. This results in a situation where each of the HPAs will see a contribution from every user in the system. Thus, intermodulation products at the outputs of each of the HPAs will be coherently related and it is not possible to treat the HPAs independently. The present invention considers only third-order intermodulation products and, rather than computing the absolute signal to interference power at any point in the system, computes the relative signal to interface power between the HPA outputs and received signals on the ground. In this manner, the effect of spatially scattering the IM power is quantified.

For any particular HPA, i.e. HPA number a, the contribution of signal k to the input of HPA number a is represented by $V_{a,k}$. This produces an HPA signal output proportional to $V_{a,k}$. Thus, the input from three arbitrary users $k_1$, $k_2$, and $k_3$ to amplifier (HPA) a is represented by $V_{a,k1}$, $V_{a,k2}$, and $V_{a,k3}$, respectively. These three users will result in a nonlinearity represented by the third order intermodulation product at the output of HPA at a frequency $f(k_1)+f(k_2)-f(k_3)$. The amplitude of this intermodulation product will be proportional to the product of the three amplitudes at the HPA input. The phase of this intermodulation product will be the phase of user $k_1$ plus the phase of user $k_2$ minus the phase of user $k_3$. Thus, at the HPA output there is an intermodulation product proportional to $V_{a,k1} V_{a,k2} V^*_{a,k3}$, where $V^*_{a,k3}$ represents the complex conjugate of $V_{a,k3}$. For this particular IM product, the contribution at the output of all of the $N_A$ HPAs may be computed. This result is multiplied through the matrices H, P, and F, represented by reference numerals 38, 36, and 34, respectively, to compute the contribution of this IM product at the center of each beam on the ground. This is repeated for every possible third order IM product among the user signals in the system. To compute the total IM power in the center of a beam on the ground at each frequency, it is assumed that the IM products generated by different users at the same frequency combine noncoherently because of the independent data modulations among the users. Thus, the total IM power received at each frequency is computed at the center of each beam on the ground.

Figure 4:
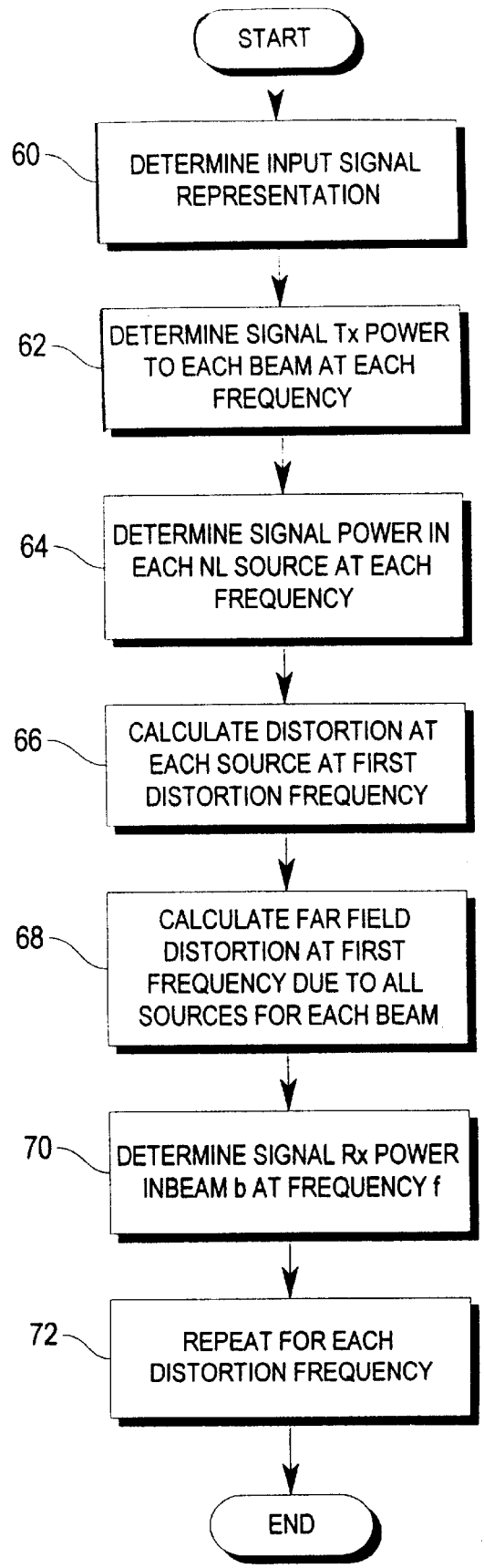
FIG. 4 is a simplified flowchart illustrating a system or method for analyzing dispersion of intermodulation power according to the present invention.
Figure 5:
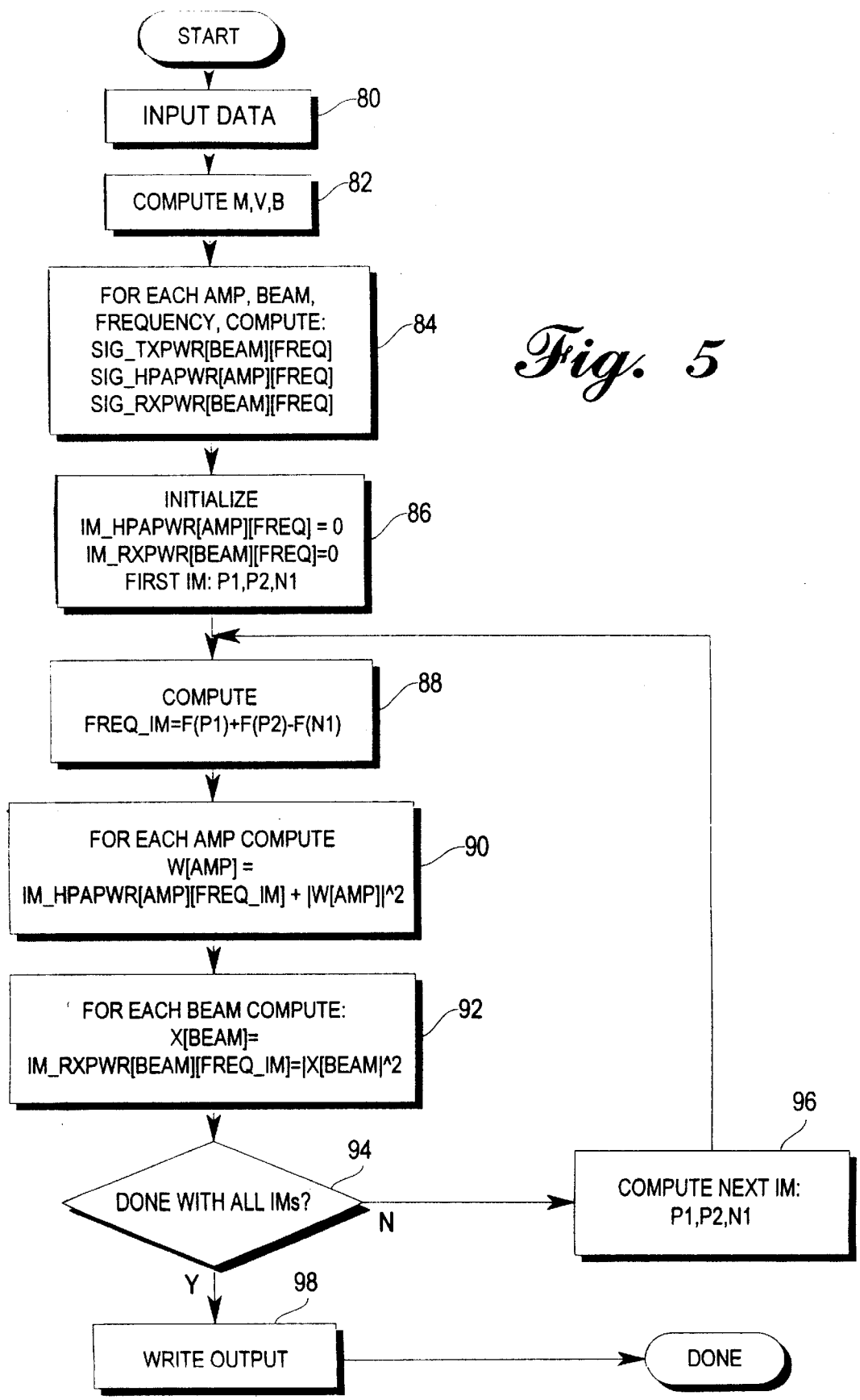
FIG. 5 is a detailed flowchart illustrating a system or method of analyzing dispersion of intermodulation power according to the present invention.

Referring now to FIG. 4, a simplified flowchart illustrating operation of a system or method according to the present invention is shown. As one of ordinary skill in the art will appreciate, the present invention does not necessarily require performing the illustrated operations in sequence. However, a sequential representation is used for use of description. As such, various steps may be performed simultaneously, or in parallel, or in a different order than that illustrated. In one embodiment of the present invention, the steps illustrated in FIGS. 4 and 5 are performed by a programmed microprocessor executing instructions, or software, which may be stored on a computer readable storage medium. Preferably, the present invention is implemented by a computer program written in the C language running on a unix workstation to process data provided interactively or previously stored in one or more data files on a computer readable medium. Of course, various operations may be performed by software and/or hardware depending upon the particular application. The computational efficiency afforded by the present invention is independent of the particular details of implementation including the operating system, processor, programming language, and the like.

Block 60 of FIG. 4 represents determination of an input signal representation. The input signal representation preferably characterizes the input(s) to the source(s) of nonlinearity using at least an amplitude and a frequency as explained in greater detail with reference to FIG. 5. For the simulation model illustrated and FIG. 2, matrix V (52) represents the input signal.

The transmitted signal power for each beam at each frequency is determined as represented by block 62. The signal power in each source of nonlinearity at each frequency is determined as represented by block 64. In the satellite communication example described here, block 64 represents determination of the signal power in each HPA at each frequency. Block 66 represents determination of the signal power received for each beam at each frequency.

Block 68 represents determination of the contribution from each source of nonlinearity at a first nonlinear distortion (NLD) frequency. As described above, the NLD frequencies are determined by sums and differences of the source signal frequencies. In one embodiment of the present invention, only the third-order effects of intermodulation distortion are considered. The far-field power of the nonlinear distortion due to all sources of nonlinearity (i.e. all HPAs) at the first NLD frequency is determined as represented by block 70. Blocks 68 and 70 are repeated for each NLD frequency as represented by block 72.

Referring now to FIG. 5, a more detailed flowchart illustrating operation of a system or method according to the present invention is shown. Various input data is specified as represented by block 80 of FIG. 5. The input data includes parameters which may be specified as command line options or, alternatively, read from data files stored on a computer readable medium. In one embodiment, the input data includes parameters such as $N_B$ which represents the number of beams or cells on the ground, $N_E$ which represents the number of antenna feed elements on the spacecraft, $N_A$ which represents the number of HPAs on the spacecraft, $N_F$ which represents the number of frequency channels in the system, and $N_K$ which represents the number of users in the system. Other input parameters include an antenna excitation matrix, E, having elements $E_{e,b}$ which represents the complex excitation of feed e to form beam b, where matrix E is a complex matrix of dimension ($N_E \times N_B$); a feed-to-beam matrix, F, having elements $F_{b,e}$ representing the complex signal received on the ground in the center of beam b when feed e has an excitation of unity, where F is a complex matrix of dimension ($N_B \times N_E$); a feedmap matrix, P having elements $P_{e,a}$ equal to unity if hybrid matrix output a connects to feed e, and zero otherwise, where P is an integer matrix of dimension ($N_E \times N_A$); and a hybrid matrix, H, representing the net matrix multiplication of all smaller hybrid matrices in the system as illustrated and described with reference to FIG. 3, where H is a complex matrix of dimension ($N_A \times N_A$).

Other input parameters represented by block 80 of FIG. 5 include a signal frequency vector, f, with elements f(k) representing the frequency channel of user k, where f is an integer vector of dimension $N_K$; a signal beam vector, b, with elements b(k) representing the beam number to which the signal for user k is transmitted, where b is an integer vector of dimension $N_K$; and a signal amplitude vector, A, with elements A(k) representing the amplitude of the signal for user k, where A is a real vector of dimension $N_K$.

An input transformation matrix (V) representing signal propagation through the system to the input of the sources of nonlinearity, an output transformation matrix (M) representing signal propagation from the source of nonlinearity to the destination, and an intermediate matrix (B) are determined as represented by block 82 of FIG. 5. Matrix B is determined by:

$$B = H^{-1} P^T,$$

while matrix M is determined by $$M = FPH,$$

where the computation is formed using standard matrix multiplication techniques well known to those skilled in the art. The notation $H^{-1}$ is used to denote the matrix inverse of H while the notation $P^T$ is used to denote the matrix transpose of P. This results in matrix B being a complex matrix of dimension ($N_A \times N_E$), and matrix M being a complex matrix of dimension ($N_B \times N_A$). The elements of the matrix V are given by:

$$V_{k,a} = A(k) \sum_{e=1}^{N_E} E_{e,b(k)} B_{a,e}.$$

As such, V is a complex matrix of dimension ($N_K \times N_A$) and the matrix element $V_{k,a}$ is the component of signal k present in HPA a.

Block 84 represents computing the signal transmit power and signal received power for each beam at each frequency and computing the amplifier power for each amplifier at each frequency. The transmitted signal power is represented by a matrix sig_txpwr having elements sig_txpwr[b][f] given by:

$$\text{sig\_txpwr}[b][f] = \sum_{k | b(k) = b \text{ and } f(k) = f} A^2(k),$$

The signal amplifier power is represented by a matrix sig_hpapwr having elements sig_hpapwr[a][f] as follows:

$$\text{sig\_hpapwr}[a][f] = \sum_{k | f(k) = f} |V_{k,a}|^2,$$

The received signal power is represented by matrix sig_rxpwr having elements sig_rxpwr[b][f] as follows:

$$\text{sig\_rxpwr}[b][f] = \sum_{k | b(k) = b \text{ and } f(k) = f} \left| \sum_{a=1}^{N_A} V_{k,a} M_{b,a} \right|^2$$

As such, sig_txpwr is a real-valued matrix of dimension ($N_B \times N_F$) with the matrix element sig_jxpwr[b][f] representing the signal power transmitted to beam b at frequency f. The matrix sig_hpapwr is also a real-valued matrix of dimension ($N_A \times N_F$) with elements representing the signal power of HPA a at frequency f. Likewise, the matrix sig_rxpwr is a real-valued matrix of dimension ($N_B \times N_F$) having elements representing the signal power received in beam b at frequency f.

Block 86 of FIG. 5 represents initialization of matrices representing the intermodulation power on the spacecraft at the source of nonlinearity (im_hpapwr) and the intermodulation power in the far field, i.e. at the destination on the ground (im_rxpwr). Indices $p_1$, $p_2$, and $n_1$ are also initialized to represent the first third-order IM product to be considered. The first IM frequency corresponding to the first IM product is determined as represented by block 88. The IM frequency for a particular instantiation of the indices $p_1$, $p_2$, and $n_1$ is given by:

freq_im=f(p$_1$)+f(p$_2$)−f(n$_1$).

For each HPA, a vector w having components $W_a$ is computed and used to increment the corresponding elements of the HPA IM power matrix as represented by block 90 where:

$$w_a = \begin{cases} \frac{1}{2} V_{p_1,a} V_{p_2,a} V_{n_1,a}^*, & p_1 = p_2 \\ V_{p_1,a} V_{p_2,a} V_{n_1,a}^*, & \text{otherwise.} \end{cases}$$

and im_hpapwr[a][freq_im]=im_hpapwr [a][freq_im]+|w$_a$|$^2$.

The vector w is a complex vector of dimension $N_A$ with elements proportional to the amplitude of the IM product in HPA a caused by signals p$_1$, p$_2$, and n$_1$.

For each beam b, a vector x is computed by multiplying the matrix M by the vector w and used to increment the far-field IM power matrix im_rxpwr as represented by block 92 according to:

x=Mw.

and im_rxpwr[b][freq_im]=im_rxpwr [b][freq_im]+|x$_b$|$^2$.

The vector x is a complex vector of dimension $N_B$ having elements x$_b$ proportional to the amplitude of the corresponding IM product received in beam b caused by signals p$_1$, p$_2$, and n$_1$.

A decision as to whether the current IM product (frequency) being considered represents the last of the analysis as represented by block 94. If the analysis is not yet complete, the indices p$_1$, p$_2$, and n$_1$ are incremented as represented by block 96 and processing returns to block 88 to compute the next IM product, i.e. the contribution of the next IM frequency to the IM power at the spacecraft and on the ground. When contributions for all the IM frequencies have been processed as represented by block 94, the output is stored as represented by block 98. The output includes the transmitted signal power matrix sig_txpwr having elements representing power transmitted to beam b at frequency f; the amplifier signal power matrix sig_hpapwr having elements representing signal power in HPA a at frequency f; the received signal power matrix sig_rxpwr having elements representing signal power received in beam b at frequency f; the HPA IM power matrix im_hpapwr having elements proportional to the IM power in HPA a at frequency f; and the IM received power matrix im_rxpwr having elements proportional to the IM power received in beam b at frequency f.

The signal to IM power ratio in HPA a at frequency f is then given by:

$$\text{SIM\_HPA}_{a,f} = \alpha \frac{\text{sig\_hpapwr}[a][f]}{\text{im\_hpapwr}[a][f]}.$$

where α is an unknown constant of proportionality. The signal to IM power ratio received in beam b at frequency f is given by:

$$\text{SIM\_RX}_{b,f} = \alpha \frac{\text{sig\_rxpwr}[a][f]}{\text{im\_rxpwr}[a][f]}.$$

The improvement in signal to IM power ratio can then be determined by:

$$\text{IMPROVEMENT}_{a,b,f} = \frac{\text{SIM\_RX}_{b,f}}{\text{SIM\_HPA}_{a,f}} = \frac{\text{sig\_rxpwr}[a][f]\text{im\_hpapwr}[a][f]}{\text{im\_rxpwr}[a][f]\text{sig\_hpapwr}[a][f]}.$$

For various applications, it may be convenient to compute an average signal to IM power ratio which is averaged over all the HPAs and averaged over frequency according to:

$$\text{SIM\_HPA}_{avg} = \alpha \frac{\sum_a \sum_f \text{sig\_hpapwr}[a][f]}{\sum_a \sum_f \text{im\_hpapwr}[a][f]}.$$

An improvement in signal to IM power relative to the average can then be computed according to:

$$\text{IMPROVEMENT}_{b,f} = \frac{\text{SIM\_RX}_{b,f}}{\text{SIM\_HPA}_{avg}}.$$

As such, the present invention provides a tremendous amount of information relative to the spatial distribution of the IM power. While the above computations provide one example or a manner in which to interpret the data, they do not limit the scope or application of the present invention. The precise manner in which an analyst may use the present invention will depend upon the details of the system under consideration and the specific goals of the analysis.

Figure 6:
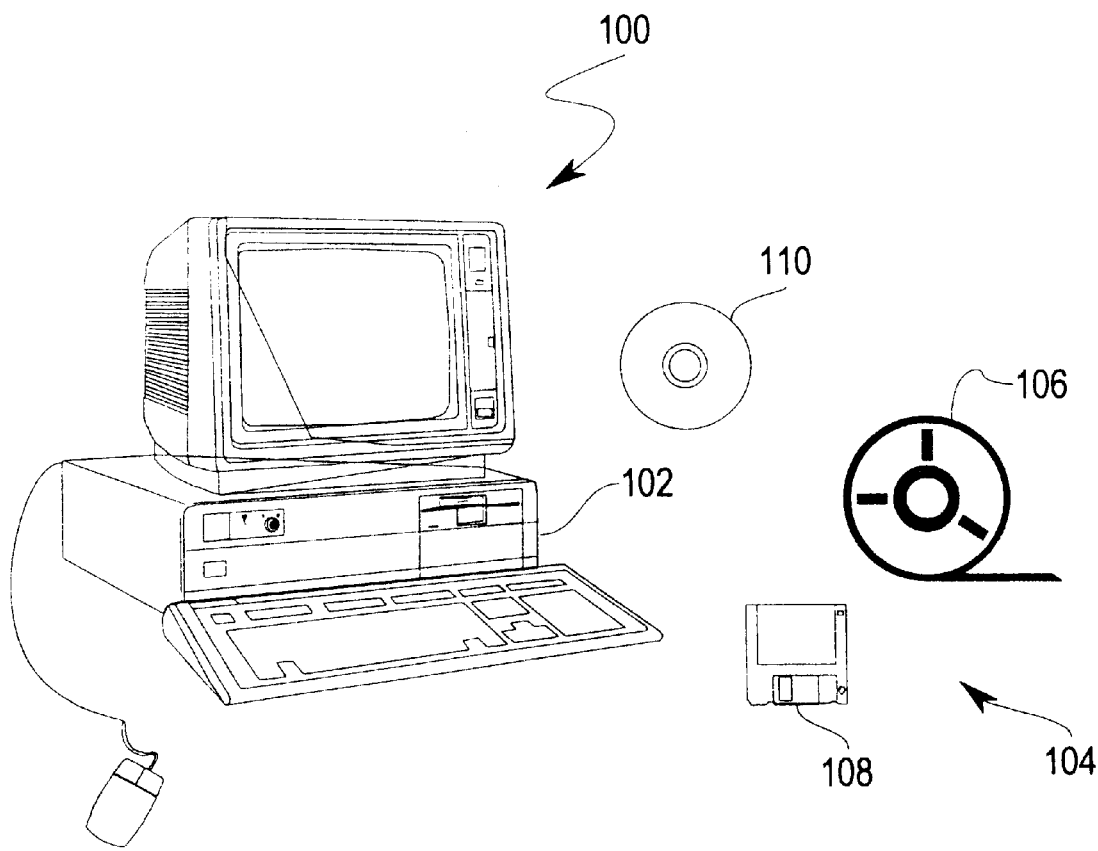
FIG. 6 is a block diagram illustrating a system for analyzing dispersion of intermodulation power according to the present invention.

Referring now to FIG. 6, a block diagram illustrating a system for computationally efficient analysis of IM dispersion according to the present invention is shown. System 100 includes a computer 102 programmed to perform a method according to the present invention as illustrated and described with reference to FIGS. 1 through 5. Preferably, computer 102 is a Unix workstation executing a program written in C. Computer 102 preferably includes appropriate devices for reading one or more computer-readable storage media 104 which may include magnetic tape 106, floppy disk 108, CD-ROM 110, hard disk (not specifically illustrated), and the like. Computer-readable storage media 104 include stored data representing instructions executable by computer 102 to perform a method for analyzing IM dispersion according to the present invention. Of course, computer-readable storage media 104 may also include input and output data in addition to data representing stored program instructions. Likewise, computer 102 may include internal computer readable storage media which may be fixed, such as RAM or ROM, or removable, such as a magnetic, optical, or opto-magnetic disk. System 100 may also include various input and output devices for batch-based or interactive processing.

As described above, a system and method according to the present invention provide computationally efficient analysis of intermodulation dispersion using a frequency-domain matrix-based analysis which tracks the frequency and amplitude of each user in the system and considers only third-order IM products. While the best mode contemplated for practicing the invention has been described in detail, those familiar with the art to which this invention relates will recognize various alternative designs and embodiments for practicing the invention as defined by the following claims.

What is claimed is:

1. A method for analyzing distortion in a satellite communication system having at least one element characterized by a nonlinear response, the method comprising:

generating a mathematical input matrix representing a plurality of signals having associated frequencies and amplitudes at an input to the at least one element;

repeatedly calculating distortion for each element based on a product of the amplitudes of a second plurality of the signals at an associated distortion frequency determined by a sum and difference of component frequencies for all possible distortion frequencies of the plurality of signals; and multiplying the distortion by a mathematical output matrix representing the satellite communication system to determine distortion in a received beam.

2. The method of claim 1 wherein the satellite communication system generates a plurality of beams to transmit the signals to a destination, the method further comprising:

determining the transmitted signal power for each of the plurality of beams at each of the plurality of frequencies;

determining the signal power in each of the at least one element at each of the plurality of frequencies; and determining the signal power received at the destination for each of the plurality of beams at each of the plurality of frequencies.

3. The method of claim 1 wherein the distortion is intermodulation distortion and each distortion frequency is an intermodulation distortion frequency and wherein the step of calculating comprises:

calculating a third-order intermodulation product for each intermodulation frequency determined by a first component frequency plus a second component frequency minus a third component frequency.

4. The method of claim 3 further comprising:

determining a first ratio corresponding to transmitted signal power divided by intermodulation power on the satellite for each of the at least one element at a selected one of the plurality of frequencies.

5. The method of claim 4 further comprising:

determining a second ratio corresponding to received signal power divided by received intermodulation power at a selected one of the plurality of frequencies within a selected one of a plurality of beams transmitted from the satellite to a destination.

6. The method of claim 5 further comprising:

determining a third ratio representing an improvement in the signal to intermodulation power ratio corresponding to the second ratio divided by the first ratio.

7. The method of claim 6 further comprising:

selecting an operating point for the at least one element based on the third ratio.

8. A computer readable storage medium having stored therein data representing instructions executable by a computer for determining dispersion of intermodulation power in a satellite communications system having at least one element with a nonlinear response, the computer readable storage medium comprising:

instructions for receiving a numerical input matrix representing a plurality of signals having associated frequencies and amplitudes at an input to the at least one element;

instructions for repeatedly calculating distortion for each element based on a product of the amplitudes of a second plurality of the signals at an associated distortion frequency determined by a sum and difference of component frequencies for all possible distortion frequencies of the plurality of signals; and instructions for multiplying the distortion by a numerical output matrix representing the satellite communication system to determine distortion in a received beam.

9. The computer readable storage medium of claim 8 further comprising:

instructions for determining transmitted signal power for each of a plurality of beams at each of the plurality of frequencies.

10. The computer readable storage medium of claim 8 further comprising:

instructions for determining the signal power in each of the at least one element at each of the plurality of frequencies.

11. The computer readable storage medium of claim 8 further comprising:

instructions for determining signal power received at a destination for each of the plurality of beams at each of the plurality of frequencies.

12. The computer readable storage medium of claim 9 further comprising:

instructions for determining a first ratio corresponding to transmitted signal power divided by distortion power on the satellite for each of the at least one element at a selected one of the plurality of frequencies;

instructions for determining a second ratio corresponding to received signal power divided by received distortion power at a selected one of the plurality of frequencies within a selected one of a plurality of beams transmitted from the satellite to a destination; and instructions for determining a third ratio representing an improvement in the signal to intermodulation power ratio corresponding to the second ratio divided by the first ratio.

13. A method for determining dispersion of intermodulation power in a satellite communication system including a digital processor in communication with a plurality of amplifiers, the amplifiers connected to a plurality of antenna feed elements via a hybrid matrix and a feedmap matrix, the system transmitting a plurality of signals at a plurality of frequencies within a plurality of beams to at least one destination, the method comprising:

determining a mathematical matrix representing amplitudes and frequencies of signals generated by the digital processor and input to the plurality of amplifiers;

determining a mathematical matrix representing signal propagation from the plurality of amplifiers to the at least one destination;

calculating a plurality of intermodulation distortion frequencies based on combinations of subsets of the plurality of signals;

calculating intermodulation power output from each of the plurality of amplifiers for each of the plurality of intermodulation distortion frequencies; and calculating intermodulation power at the at least one destination within each of the plurality of beams at each of the plurality of intermodulation distortion frequencies.

14. The method of claim 13 wherein the step of calculating intermodulation power at the at least one destination comprises performing a matrix multiplication of the mathematical matrix representing propagation of the signals from the amplifiers by a mathematical matrix representing the intermodulation power output from each of the plurality of amplifiers.

15. The method of claim 13 wherein the step of calculating a plurality of intermodulation distortion frequencies comprises adding frequencies of corresponding first and second ones of the plurality of signals and subtracting a frequency corresponding to a third one of the plurality of signals.

16. The method of claim 13 wherein the step of calculating a plurality of intermodulation distortion frequencies comprises calculating each intermodulation distortion frequency using sums and differences of frequencies corresponding to a subset of the plurality of signals.

17. The method of claim 13 further comprising:

determining transmitted signal power for each of the plurality of beams at each of the plurality of frequencies;

determining amplifier signal power for each of the plurality of amplifiers at each of the plurality of frequencies; and determining received signal power at the at least one destination for each of the plurality of beams at each of the plurality of frequencies.

18. The method of claim 17 further comprising:

determining a first ratio corresponding to transmitted signal power divided by intermodulation distortion power on the satellite for each of the plurality of amplifiers at a selected one of the plurality of frequencies;

determining a second ratio corresponding to received signal power divided by received intermodulation distortion power at a selected one of the plurality of frequencies within a selected one of a plurality of beams transmitted from the satellite to the at least one destination; and determining a third ratio representing an improvement in the signal to intermodulation power ratio corresponding to the second ratio divided by the first ratio.

19. A method for analysis of intermodulation dispersion in satellite systems having amplifiers coupled to an antenna array, the method comprising:

calculating only third-order intermodulation products for each intermodulation frequency to improve computational efficiency;

calculating improvement in signal to intermodulation ratio between the amplifiers on the satellite and received signals on the ground based on the intermodulation products without requiring specification of the operating point of the amplifiers or calculating signal to intermodulation ratio at either the amplifiers or on the ground.

20. The method of claim 19 further comprising:

selecting an operating point for the amplifiers based on the calculated improvement in signal to intermodulation ratio.

21. The method of claim 19 wherein the step of calculating third-order intermodulation products comprises separately tracking contributions of each user signal based on a corresponding amplitude and frequency to quantify spatial scattering of the intermodulation products.

* * * * *